United States Patent [19]

Horan

[11] Patent Number: 5,144,461
[45] Date of Patent: Sep. 1, 1992

[54] PORTABLE HOLOGRAPHIC RECORDING APPARATUS

[76] Inventor: Philip R. Horan, 308 Carlton Dr., Syracuse, N.Y. 13214

[21] Appl. No.: 718,298

[22] Filed: Jun. 20, 1991

[51] Int. Cl.⁵ .......................... G03H 1/04; G03B 17/26
[52] U.S. Cl. ...................................... 359/30; 354/276; 354/278; 359/35
[58] Field of Search .......................... 359/1, 30, 32, 35; 354/275, 276, 281, 278

[56] References Cited

U.S. PATENT DOCUMENTS

| | | | |
|---|---|---|---|
| H,841 | 11/1990 | Lanteigne | 359/35 |
| 3,526,444 | 9/1970 | Carcel et al. | 359/35 |
| 3,826,555 | 7/1974 | Matsumoto | 359/1 |
| 3,837,726 | 9/1974 | Suzuki et al. | 359/1 |
| 4,508,420 | 4/1985 | Nishiwaki | 359/32 |
| 4,707,053 | 11/1987 | Gurevich et al. | 359/30 |
| 4,712,851 | 12/1987 | Fusek et al. | 359/1 |

FOREIGN PATENT DOCUMENTS

| | | | |
|---|---|---|---|
| 52907554 | 8/1980 | Fed. Rep. of Germany | 359/35 |
| 647744 | 2/1979 | U.S.S.R. | 359/35 |

OTHER PUBLICATIONS

"Real-Time Holography Plateholder," Gaertner Scientific Company, Chicago, Ill., Bulletin 156-71L (1972).

Primary Examiner—Bruce Y. Arnold
Assistant Examiner—Martin Lerner
Attorney, Agent, or Firm—Katherine McGuire

[57] ABSTRACT

A holographic camera assembly includes a portable, light-tight housing having a removable cover to access the interior thereof. Camera components are positioned upon an optics tray within the housing which is vibrationally isolated from the housing. The film is releasably mounted within a frame and includes a releasable film casing protecting the film from ambient light. The frame, including the film and casing, is releasably mounted upon a rotatable platform in one corner of the tray and a three-dimensional object of one's choice is positioned therebehind. The cover is replaced upon the housing making the interior thereof light-tight. Means operable at a control panel externally of the housing selectively raise and lower the casing about the film. When in the fully raised position, a coherent light beam is allowed to travel along a fixed path (by action of a timed shutter mechanism) to pass through the film to strike the object. The reflection of light by the object back to the film creates the hologram. Following exposure, the casing is again lowered about the film which may then be removed from the housing for further film processing.

19 Claims, 5 Drawing Sheets

PORTABLE HOLOGRAPHIC RECORDING APPARATUS

BACKGROUND OF THE INVENTION

This invention relates to apparatus for making holographic images of three-dimensional objects and, more particularly, to holographic recording apparatus which is portable and easy to use which makes it an especially useful tool in the teaching environment.

In the making of holographic pictures, it is of utmost importance to eliminate or substantially reduce all vibrational disturbances as well as air currents and temperature fluctuations which virtually destroy the holographic image when raised above a tolerable threshold. The prior art thus includes various vibration reduction techniques such as positioning the camera assembly elements within a bed of sand and weighing down the camera support table, typically with concrete.

An example of one such vibration reduction technique may be seen in U.S. Pat. No. 3,526,444 issued to Carcel et al on Sep. 1, 1970. Other vibration reduction techniques include an elaborate framework in which camera elements are mounted (U.S. Pat. No. 4,707,053 issued to Gurevich et al on Nov. 17, 1987) and embedding the optical system in a transparent molding material (U.S. Pat. No. 4,508,420 issued to Nishiwaki on Apr. 2, 1985).

In addition to vibrational stability, it is of course necessary that no light impinge upon the film during exposure other than the coherent light source beam which comprises the so-called "reference beam". The above requirements obviously pose of a definite challenge to teaching the holographic process to a group of students in the classroom. The present inventor realized the need for a holographic assembly which could be easily transported from classroom to classroom and allow a group of students to easily observe the apparatus and process and also make their own holographic pictures using the apparatus, all in a short period of time.

It is thus a principal object of the present invention to provide a holographic camera assembly which is compact and portable.

It is a further object to provide a holographic camera assembly having a light-tight, external housing providing an enclosure for the camera components such that a conventional "dark room" environment is not necessary during the holographing procedure.

It is another object to provide a holographic camera assembly which includes an easy to use control panel externally of the housing.

It is yet another object to provide a holographic camera assembly including a unique, light-tight film casing which permits the deposit and removal of the film and film casing in and out of the enclosure, respectively, thereby preventing destructive exposure of the film, means included to lift and lower the casing about the film during exposure within the housing.

It is still another object to provide a holographic camera assembly which includes simple yet effective techniques for substantially reducing the effects of vibration, temperature and air currents.

Other objects will in part be obvious and in part appear hereinafter.

SUMMARY OF THE INVENTION

In accordance with the foregoing objects, the invention comprises a holographic camera assembly to take holograms of mainly small, three-dimensional objects. The entire camera assembly is mounted for operation within a portable, light-tight housing which includes a removable cover permitting access to the interior thereof. A removable "optics tray" on which the main camera components are mounted is positioned within the housings. Foam rubber inserts (e.g., SORBATHANE machine mounts) are positioned between the bottom surface of the housing and the optics tray to reduce vibrational effects to the camer components on the optics tray.

The housing and optics tray are of generally square outline thereby allowing a wide variety of holographic setups. A neon laser provides the coherent light source whose beam is diffused by a diverging lens and directed towards and reflected by a mirror to the object being holographed. The object is previously mounted upon a platform and positioned immediately behind the holographic film which consists of a glass plate with a photographic emulsion disposed thereon. The light reflected by the mirror (reference beam) is directed to pass through the film and impinge upon the object. Light reflected by the object back towards the film (object beam) creates an interference pattern upon the glass plate film which results in the holographic image.

A unique film casing is provided which acts to cover and protect the glass plate film from destructive exposure to ambient and artificial light. Once mounted inside the housing with the object placed therebehind, the housing is closed. An external control panel operates the shutter (positioned between the laser and the mirror) and movement of the film casing about the film.

In particular, the film casing is releasably secured about the film to the base of a frame which holds the film in the proper, upright position. After the frame is securely mounted within the housing, the casing securing means are released with the film casing remaining in covering relation about the film. Means to lift the casing about the film are then releasably attached to the casing and the housing is closed. Using the control panel, the casing raising means are actuated rasising the film casing above the film within the light-tight housing. The film is exposed by opening the shutter for a predetermined amount of time and the film casing is then lowered to agin encase the film. The housing is opened, the releasable securing means which secure the film casing to the frame are again secured to the frame, the casing raising means is released and the casing and film are removed from the housing for further film processing.

DETAILED DESCRIPTION

Figure 1:
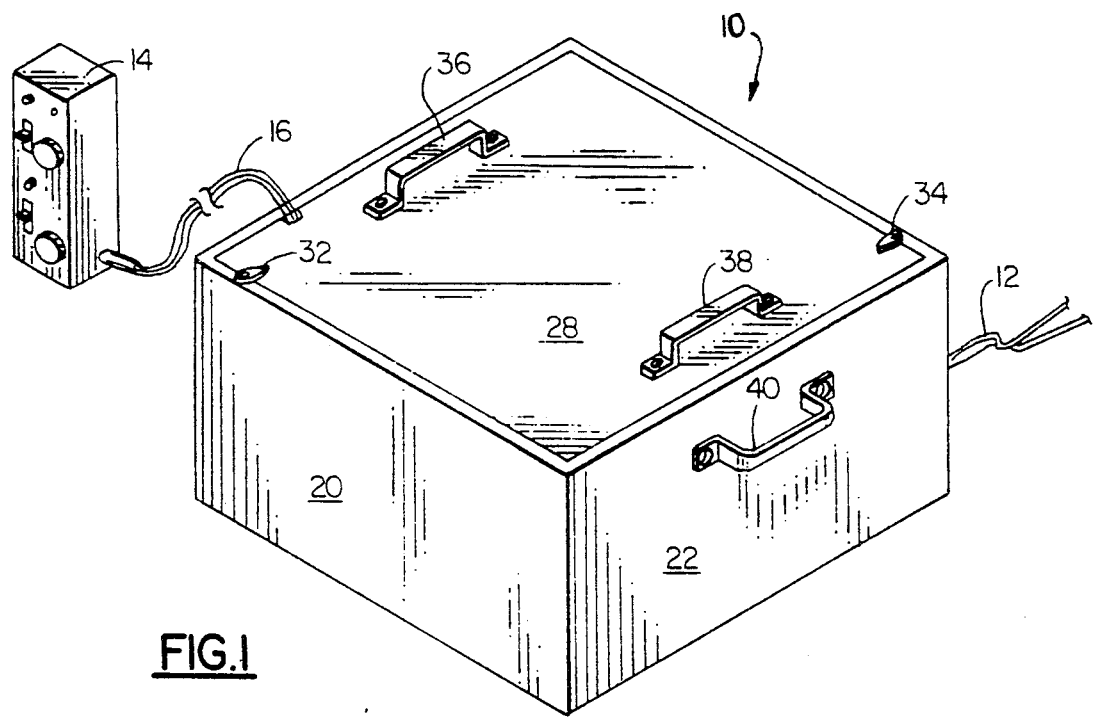
FIG. 1 is a perspective view of the housing and external control panel.

Referring now to the drawings, there is seen in FIG. 1 a housing 10 which provides a light-tight enclosure for the holographic camera components to be described. Electric wires 12 extend from one side of the housing to provide electricity to the coherent light source located within the housing. A control panel 14 includes wires 16 which extend into the housing to provide operational control of the shutter mechanism and film casing lift mechanism as will be understood below.

Figure 2:
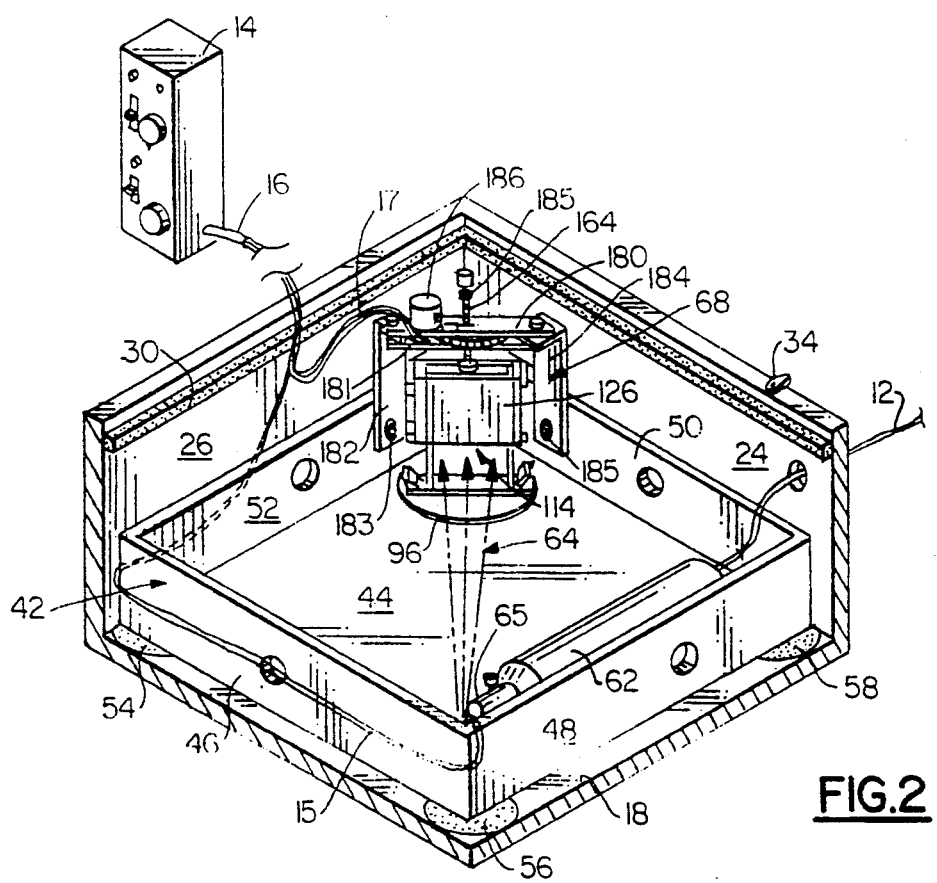
FIG. 2 is the view of FIG. 1 with portions of the housing broken away to reveal the holographic camera assembly mounted upon the optics tray within the housing.

As seen, housing 10 is of generally square configuration having a bottom 18 with four side walls 20, 22, 24 and 26 extending therefrom to define an open top having a removable cover 28. (FIGS. 1 and 2). As seen in FIG. 2, a foam lining 30 extends along the perimeter of the top of the four side walls on which the perimeter of cover 28 lies when secured to close housing 10 as seen in FIG. 1. Tabs 32 and 34 are pivotally mounted to the top edges of side walls 20 and 24, respectively, and may be moved over cover 28 to secure it to housing 10. Handles 36 and 38 are provided on the top surface of cover 28 for ease of handling. Handle 40 on side wall 22 and opposite side wall 26 (not shown) are provided for carrying housing 10, if desired. In this respect, it is noted that housing 10, including all contents thereof, is entirely portable. The present inventor has discovered that it is easiest to mount housing 10 upon a cart with wheels which may be easily moved from classroom to classroom as desired with little or no upset to the holographic recording elements within housing 10. If desired, housing 10 may also be placed upon foam blocks (not shown) to increase its vibrational stability.

Figure 3:
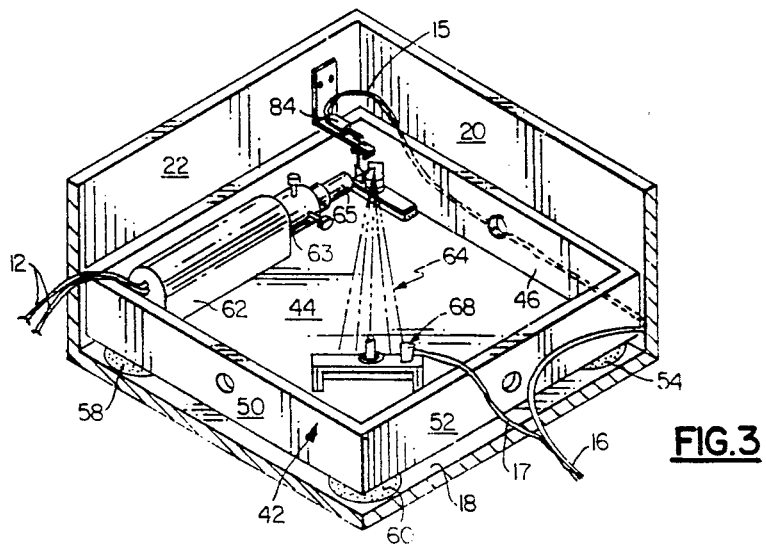
FIG. 3 is the view of FIG. 2 showing an opposite corner where the laser is positioned to impinge upon the mirror which reflects the light towards the film located in the corner seen in FIG. 2.

Referring to FIGS. 2 and 3 which show diametrically opposite views, an optics tray 42 having a planar bottom surface 44 with four side walls 46, 48, 50 and 52 extending perpendicularly therefrom is releasably mounted within housing 10 upon foam discs 54, 56, 58 and 60. Being thusly separated by the foam discs (e.g., SORBATHANE machine mounts sold by Edmund Scientific Co.), the bottom surface 44 of optics tray 42 lies in a plane substantially parallel to and spaced above bottom 18 of housing 10. In this respect, it may be seen that optics tray 42 does not directly contact any part of housing 10. Side walls 20, 22, 24 and 26 of housing 10 extend vertically beyond and are in planes spaced and parallel from walls 46, 48, 50 and 52 of optics tray 42. With optics tray 52 mounted upon foam discs in spaced relation to housing 10, the holographic camera components mounted on optics tray 42 are vibrationally isolated from housing 10. By virtue of housing 10 providing a light-tight enclosure for the camera components, they are also protected from external disturbances such as air-currents and sudden temperature fluctuations which could destroy the resultant hologram.

Figure 4:
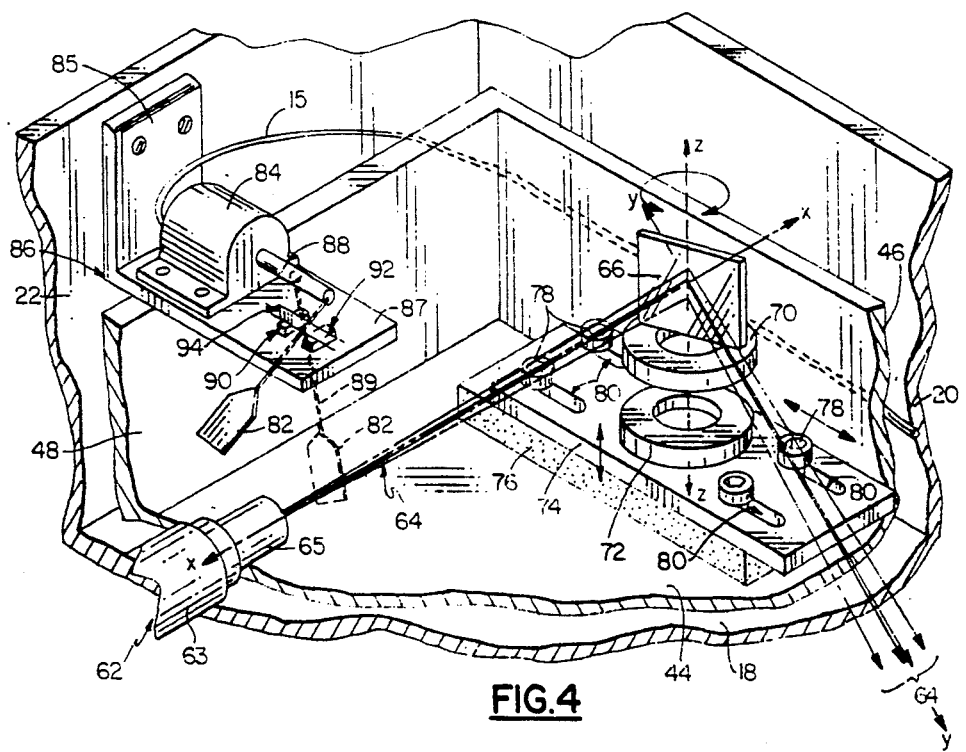
FIG. 4 is an enlarged, broken away view of the inside corner of the housing seen in FIG. 3 showing positional relationship of the laser, shutter and mirror components of the camera assembly, parts of the mirror mount being shown in exploded relation.

Attention is now turned to the holographic camera components positioned for operation within housing 10. As seen in FIGS. 2, 3 and 4, a coherent light source in the form of a neon laser 62 is positioned adjacent optics tray side wall 48 to direct coherent light 64 along a fixed path having a first linear axis x—x. Light 64 is diffused or expanded at laser 62 by a diverging lens 65 mounted upon the end of laser 62 and spatial filter 63 from which light 64 emanates. A front-surface mirror 66 is rotatably mounted at an angle to light 64 adjacent wall 46 to reflect light 64 along the fixed path about a second linear axis y—y toward the film assembly 68 and the object 69 to be holographed (FIG. 5) which are positioned in the corner formed at the intersection of optics tray side walls 50 and 52. It may be appreciated that mirror 66 effectively extends the optical path of light 64 within square housing 10 thereby allowing the camera assembly to operate within a smaller area than would be possible without a reflecting mirror. This is due to the fact that for a specific size film, the area of the diffused light must be large enough to impinge upon substantially the entire surface area of the film. The further the light travels, the larger its area of dispersion becomes. In instances where space is not of concern, beam 64 could be directed along a single, linear path to strike the film without the need of a reflecting mirror.

Referring to FIG. 4, mirror 66 is fixedly anchored upon a first washer magnet 70 which in turn is releasably and magnetically mounted upon a second magnet 72 (seen in spaced relation thereto). Of course the respective surfaces of magnets 70 and 72 making contact are of opposite polarity thereby attracting them together. Bottom magnet 72 is fixedly mounted to rectangular plank 74 which is mounted in covering relation to a rectangular piece of rubber foam 76 by means of screws 78 passing through elongate slots 80 in plank 74. Mirror 66 may be adjusted vertically by tightening or loosening screws 78 thereby compressing or expanding foam 76, respectively. Mirror 66 may also be moved horizontally by loosening screws 78 and sliding plank 74 and slots 80 about screws 78. It may also be appreciated that mirror 66 may be adjusted about a plurality of axes simply by tightening one screw while loosening another until mirror 66 is set at the desired angle with respect to incoming light 64. There are also other means contemplated for adjusting mirror 66. For example, instead of a bottom foam rubber layer 76, a second plank with screws passing through springs placed between the planks could be provided.

Rotating top magnet 70 with respect to stationary, bottom magnet 72 rotates mirror 66 about a third axis z—z. Rotation of mirror 66 permits adjustment to provide proper illumination of light 64 upon the film in a first regard, and also permits one to direct light 64 to other places within housing 10 in another regard. For example, if one desired use of a beam splitter instead of a diverging lens 65, the beam splitter(s) could be placed in a variety of locations upon optics tray bottom 44 in which case light 64 would need to be diverted thereto.

A shutter 82 and shutter actuating means in the form of a solenoid 84 are provided to control exposure of the film to light 64. A first planar wall 85 of L-shaped bracket 86 is anchored to housing side wall 22 with a second planar wall 87 extending perpendicularly therefrom to form a ledge upon which solenoid 84 is mounted. Bracket 86 is mounted to the housing 10 rather than the optics tray 42 to reduce vibration to tray 42 during movement of shutter 82. Solenoid 84 is selectively operable at control panel 14 via wires 15 to move shaft 88 axially which moves arm 89 and shutter 82 in the path of light 64 (phantom lines) and out of the path of light 64 (solid lines). A pair of rubber bumpers 90 and 92 are affixed to the underside of bracket wall 87 adjacent elongate slot 94 in which arm 89 moves, the bumpers provided as a stop for arm 89 and to reduce vibration to optics tray 42 during movement of arm 89 and shutter 82. The amount of time shutter 82 is out of the path of light 64 is the exposure time which may be regulated by a timing mechanism at control panel 14. A typical hologram exposure time is about 4 or 5 seconds.

Figure 5:
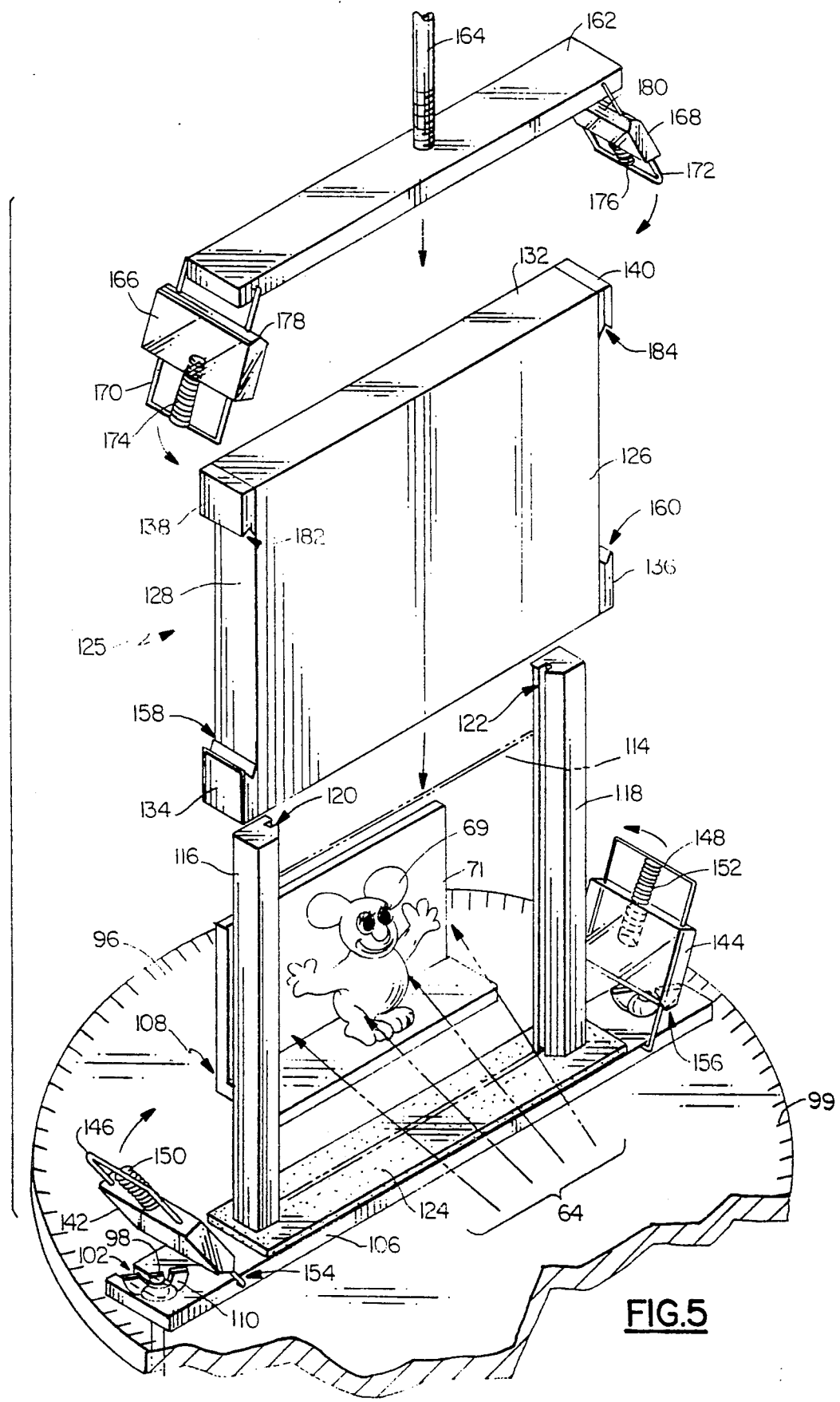
FIG. 5 is a perspective, enlarged view of portions of the platform and film assembly seen in FIG. 2 comprising the film seen in phantom mounted within a frame with the film casing and casing lift member seen in exploded relation thereto and further showing a three dimensional object positioned therebehind to be holographed.
Figure 6:
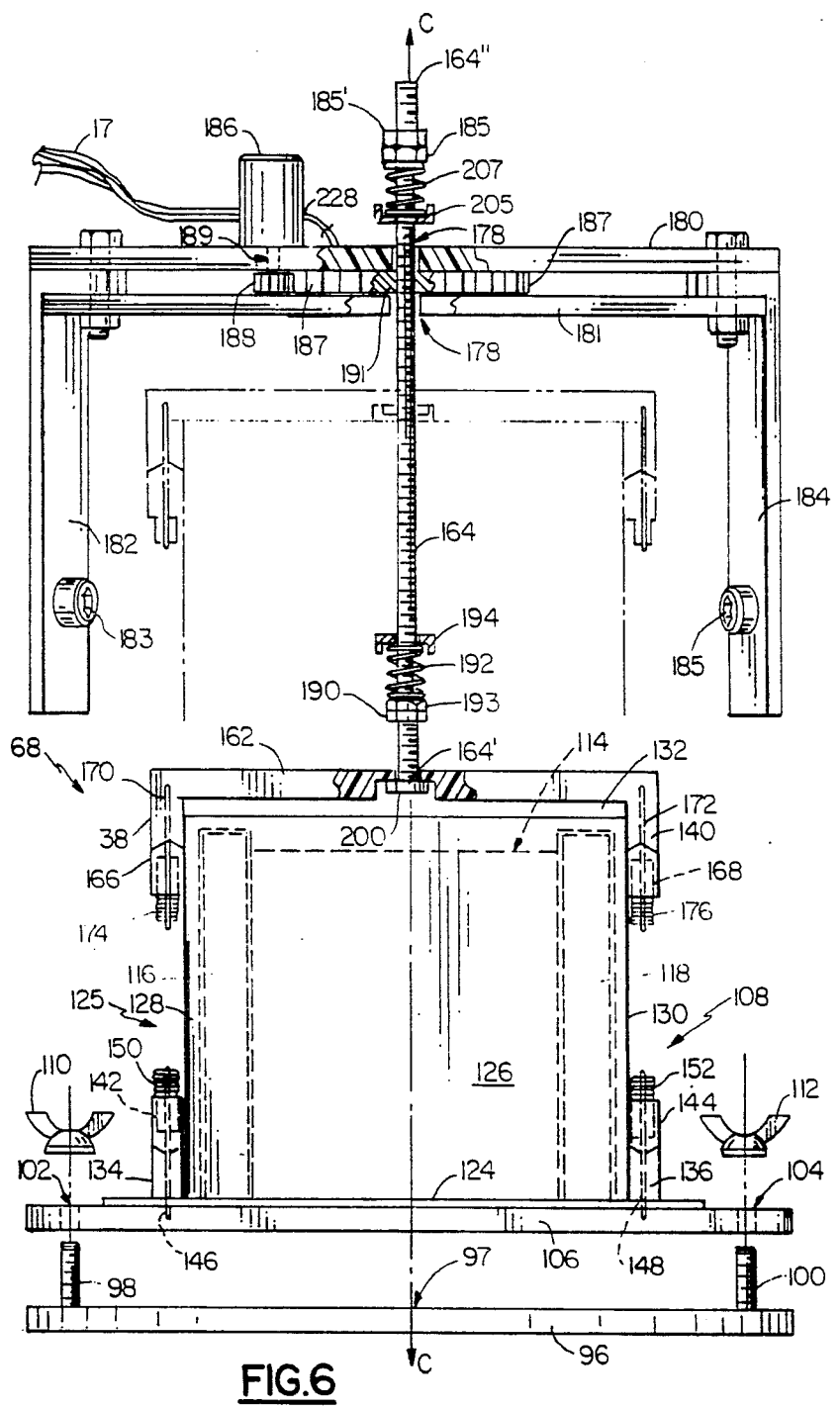
FIG. 6 is a front, elevational, enlarged view of the film assembly seen mounted within a corner of the housing in FIG. 2 showing the film lift in the lowered (solid lines) and raised positions (phantom lines) about the film casing.
Figure 7:
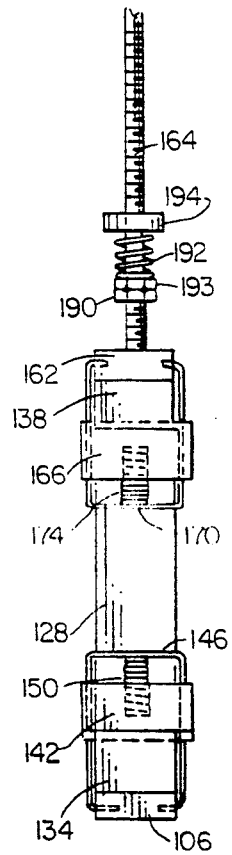
FIG. 7 is a side, elevational view of the film casing, securing latches and lift member of the film assembly seen in FIG. 6.

Turning attention to film assembly 68 seen best in FIGS. 5 and 6, it is seen that film assembly 68 is positioned upon a substantially circular platform 96 which is rotatably mounted at its center 97 on optics tray bottom surface 44 in the corner opposite mirror 66 (at the intersection of optics tray side walls 50 and 52). It is seen that circular platform 96 includes a pair of spaced, threaded posts 98 and 100 mounted vertically thereon. Posts 98 and 100 are provided to slide through slots 102 and 104 on either end of frame base 106 to releasably secure the film frame 108 to platform 96 via wing nuts 110 and 112, respectively.

Referring specifically to the components of film assembly 68, the glass plate film 114 of substantially square outline is mounted for exposure within housing 10 by a film frame 108 having an elongated, rectangular base 106. As aforementioned, base 106 includes transverse slots 102 and 104 for passage of posts 98 and 100 to releasably secure frame 108 including film 114 to platform 96. A pair of spaced, parallel beams 116 and 118 vertically extend from base 106 and include inner facing surfaces having traversing grooves 120 and 122, respectively, for slidingly and loosely removably receiving opposite edges of film 114 therebetween. Base 106 is seen to include a foam layer 124 between beams 116 and 118 to create a light-tight seal between the bottom of film casing 125 and base 106.

Film casing 125 has a front wall 126, a back wall (not shown) parallel and spaced from front wall 126, opposite side walls 128 and 130 extending therebetween and a top wall 132, all providing an open bottom which may be passed over and about film 114 and beams 116 and 118 to completely encase both the film and beams within casing 125. Casing 125 includes latch receiving elements 134 and 136 at the bases of side walls 128 and 130, respectively, and elements 138 and 140 at the tops of side walls 128 and 130 adjacent top wall 132, respectively. Prior to deposit of film 114 and frame 108 within housing 10, film casing 125 is releasably secured about film 114 in a dark-room environment (such as in a daylight changing bag which is generally known in the art) to frame base 106 via spring-loaded latch elements 142 and 144. In particular, casing 125 is lowered over film 114 such that the edges defining the casing's open bottom firmly contact foam layer 124 which is provided to create a light-tight seal between the bottom of casing 125 and frame base 106. Latch elements 142 and 144 are pivotally mounted via rectangular wires 146 and 148, respectively, upon base 106 along axes perpendicular to the main longitudinal axis of base 106. Springs 150 and 152 permit elements 142 and 144 to be slidingly raised and lowered upon opposite arms of wires 146 and 148, respectively.

To secure latching elements 142 and 144 to respective receiving elements 134 and 136, elements 142 and 144 are pivoted upon wires 146 and 148 towards the side walls of casing 125 having receiving elements 134 and 136. Latch elements 142 and 144 are then slidingly moved along respective wires 146 and 148 against respective springs 150 and 152 thereby compressing the springs between respective latch elements 142 and 144 and the tops of wires 146 and 148. The respective bottom edges 154 and 156 of latch elements 142 and 144 are outwardly V-shaped in cross-section and are formed to mate with the inwardly V-shaped top edges 158 and 160 of receiving elements 134 and 136, respectively. As such, latch elements 142 and 144 may be "snap-fit" to latch receiving elements 158 and 160, respectively, due to the biasing effect of springs 150 and 152, respectively.

With casing 125 thus secured about film 114 to frame base 106, film 114 is protected from ambient and artificial light which would result in premature, unintended exposure of film 114. The film 114 held within frame 108 may then be deposited into housing 10 upon platform 96 as previously described.

After base 106 has been secured to posts 98 and 100 upon platform 96, a casing lift mechanism in the form of an elongate lift bar 162 and threaded rod 164 is lowered, in the manner to be explained, upon casing top wall 132. A pair of spring-loaded latch members 166 and 168 are pivotally secured to respective ends of lift bar 162 in the same manner as latching elements 142 and 144 described above. With lift bar 162 lying in covering relation to casing top wall 132, elements 166 and 168 are moved adjacent casing receiving elements 138 and 140, respectively, and releasably secured thereto. Configured and working in the same manner as respective latch elements 142 and 144 and receiving elements 134 and 136 described above, latch elements 166 and 168 are slidingly moved upon opposite arms of respective wires 170 and 172 in a direction compressing respective springs 174 and 176. Top edges 178 and 180 of latching elements 166 and 168, respectively, mate with bottom edges 182 and 184 of receiving elements 138 and 140, respectively. Lift bar 162 is thusly secured to top wall 132 of film casing 125 as may be seen in the solid line position in FIG. 6.

Following securement of lift bar 162 to casing 125, latch elements 142 and 144 are released from receiving elements 134 and 136 and are moved in a direction away from casing 125. With casing 125 maintained in the lowered position fully encasing film 114, a three-dimensional object 69 is mounted upon platform 96 immediately behind film 114 as seen in FIG. 5 such that the film 114 is between object 69 and incoming light 64. If desired, object 69 may itself be securely mounted to an L-shaped platform 71 colored white to improve reflection of light 64 defining the ratio of object beam to reference beam. Housing cover 28 may then be placed upon the open top of housing 10 and tabs 32 and 34 are secured thereover, thereby preventing any external light from entering the interior of housing 10.

Referring to FIGS. 2 and 6 and particularly to operation of the casing lift mechanism, it is seen that threaded rod 164 is secured at one end thereof to substantially the center of lift bar 162. Rod 164 extends vertically and perpendicularly therefrom in a direction normal toward cover 28 through vertically aligned holes 178 in horizontal mounting members 180 and 181. Mounting members 180 and 181 lie in spaced, parallel planes above optics tray bottom surface 44 and are secured in place at either end by wall brackets 182 and 184 which are anchored adjacent their bottom ends via screws 183 and 185 to optics tray walls 52 and 50, respectively. It may be realized that brackets 182 and 184 may be easily made adjustable to accomodate various sized films and casings.

A motor 186 is mounted upon top member 180 and is selectively actuable at control panel 14 via wires 17 to rotate small gear 188 via shaft 189 extending through member 180 in either the clockwise or counter-clockwise directions. Gear 188 is rotatably mounted between members 180 and 181 in a position engaging larger gear 187 which is coplanar with gear 188. A nut 191 is located at the center of gear 187 and is fixedly mounted thereto such that nut 191 rotates with gear 187. Rod 164 is seen to extend through nut 191 whereby rotation of gear 187 and nut 191 causes rod 164 to travel up or down on the threads of nut 191 depending on the respective direction of rotation of gears 188 and 187. It is seen in FIG. 6 that rod 164 travels along axis C—C which extends through the centers of casing 125, frame base 106 and platform 96 such that platform 96 may be rotated with the film, casing and raising mechanism including rod 164 remaining in axial alignment. In this regard, it is seen in FIG. 5 that index markings 99 are provided about the perimeter of platform 96 permitting measured rotation thereof. If one desires to make multi-channel exposures, a first object could be holographed (i.e., "exposed") within housing 10 at +20° (clockwise rotation), and a second object would be holographed (using the same film) at −20° (counter-clockwise rotation). The resulting hologram would show the first object when tilted one way and the second object when tilted the other way.

To make a hologram (assuming all steps previously described have been completed), power is supplied to neon laser 62 via electric cord 12 which thereby emits diffuse, coherent light 64 through diverging lens 65. Shutter 82 is normally positioned in the path of light 64 such that it does not strike mirror 66 and reflect toward film 114. At this point, motor 186 is actuated at control panel 14 to rotate gears 188 and 187 in first, respective directions causing rod 164 to travel on the threads of nut 191 vertically upward toward cover 28 through hole 178 in mounting members 180 and 181. As aforementioned, a first, bottom end 164' of rod 164 is fixedly secured to lifting member 162 via nut 200. The second, top end 164" of rod 164 includes two locking nuts 185 and 185', rod 164 being of a length such that top end 164" does not strike the inside surface of cover 28 when rod 164 is moved to the fully raised position.

As rod 164 travels upwardly, lift member 162 lifts casing 125 from frame 108 thereby revealing film 114 in the sense that film 114 is no longer encased or surrounded on all sides by film casing 125. The rising of casing 125 is due, of course, to the fact that rod 164 and lift member 162 are releasably secured thereto by latching members 166 and 168, and also the fact that casing 125 is no longer secured to frame 108 since latching members 142 and 144 have previously been released as described above.

Figure 9:
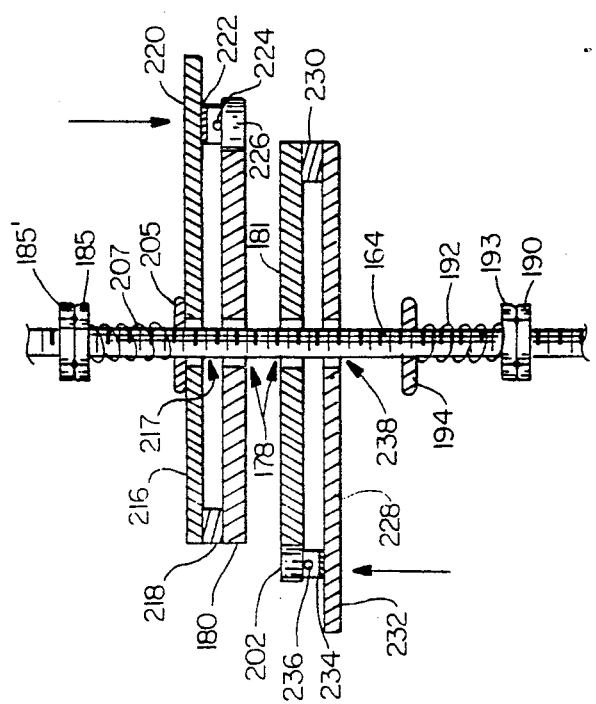
FIG. 9 is an elevational, cross-sectional view taken generally along the line 9—9 in FIG. 8.
Figure 8:
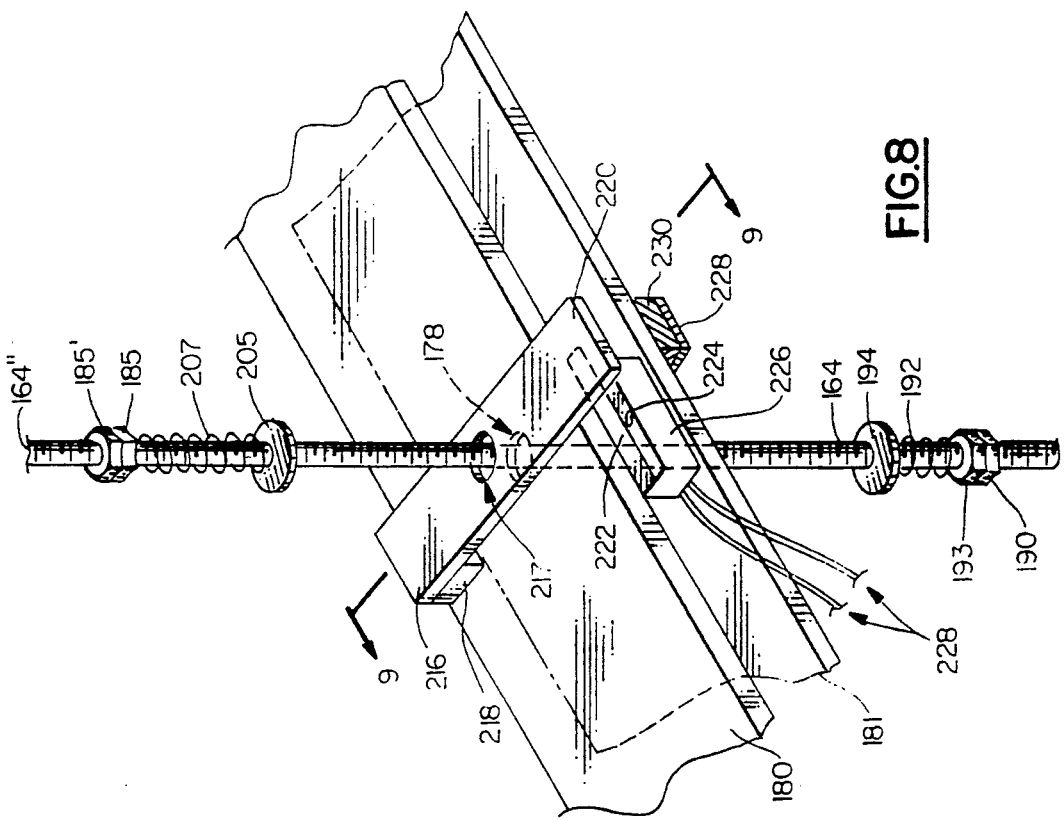
FIG. 8 is an enlarged, perspective, cut-away view showing the rod extending through the mounting members including the limit switch arrangement on the top mounting member.

Turning attention to FIGS. 8 and 9, means to stop motor 186 upon rod 164 reaching both the fully lowered and fully raised positions are shown which are not shown in FIG. 6 for purposes of clarity. To stop motor 186 upon rod 164 reaching the fully lowered position with casing 126 fully surrounding film 114, a resilient lever 216 is provided having a first end mounted to a spacer 218 on one edge of top member 180. Lever 216 extends transversely across member 180, over hole 178, terminating in a second end 220 which is positioned to engage a limit switch lever 222. Limit switch 226 is seen mounted to the edge of member 180 opposite the edge on which appear 218 is mounted. Upon washer 205, spring 207 and washers 185 and 185' pressing against lever 216 when rod 164 travels downwardly, lever 216 presses switch lever 222 which pushes a button 224 on switch 226. Wires 228 lead and attach to motor 186, the pushing of button 224 opening a circuit to shut motor 186 off. It is noticed lever 216 is provided with a hole 217 through which rod 164 extends, washer 205 of sufficiently large diameter to prevent it and spring 207 from passing therethrough. When rod 164 rises, lever 216 disengages switch lever 222 to release button 224.

In a like manner, it is seen in FIG. 9 that a limit switch and lever are also provided on the underside of bottom member 181 to stop motor 186 when rod 164 reaches the fully raised position. In particular, a second lever 228 is mounted upon spacer 230 on the edge of member 181 opposite the edge on which spacer 218 is mounted to member 180. Lever 228 extends transversely across member 181, terminating in a second end 232 which is positioned to engage limit switch lever 234 of limit switch 202, limit switch 202 mounted to the edge of member 181 opposite the edge on which spacer 230 is mounted. As rod 164 travels upwardly to lift casing 124 from film 114, washer 194 hits and depresses lever 228 which in turn depresses limit switch lever 234 which depresses limit switch button 236 to turn motor 186 off via wiring (not shown). It is noticed lever 228 includes a hole 238 through which rod 164 extends. As rod 164 travels downwardly through actuation of motor 186 at control panel 14, washer 194, spring 192 and locking nuts 193 and 190 travel downwardly upon rod 164 to release lever 228, limit switch lever 234 and button 236.

It may be appreciated from the foregoing that locking nuts 190 and 193 at the bottom end of rod 164 and locking nuts 185 and 185' at the top of rod 164 may be adjusted on rod 164 to engage respective levers 216 and 228 at the proper times. Springs 192 and 207 provide a "cushioning" such that over-torquing of the nuts against the levers is prevented.

With film casing 125 in the fully raised position, film 114 is exposed as seen in FIG. 5. (FIGS. 5 shows casing 125 raised above beams 116 and 118 only for the sake of clarity, it being understood that casing 125 normally would not extend above the tops of beams 116 and 118.) The apparatus is then allowed to sit still for approximately 2–4 minutes to allow all vibrations to settle. It is noted that 2–4 minutes is a sufficient settling time for the present apparatus while most prior art holographic set-ups require on the order of a 10 minute settling time. The timing mechanism on the control panel 14 is used to set the desired exposure time (e.g., 5 seconds). Solenoid 84 is then actuated at control panel 14 via wires 16 and 17 to move shutter 82 clear of the path of light 64 (solid lines in FIG. 4) for the predetermined amount of time as set by the timing mechanism at panel 14. During this exposure time, light 64 travels about first linear axis x—x to strike mirror 66 which is adjusted to an angle to reflect light 64 about second axis y—y to strike a first surface of and pass through film 114. Light 64 up to this point is termed the "reference beam". Light 64 proceeds to pass through transparent film 114 and strike object 69. Objects 69 reflects the light 64 back to the second, opposite surface of film 114 which includes the photographic emulsion disposed thereon ("object beam") which thereby creates an interference pattern with the reference beam upon film 114.

With the hologram thus formed upon film 114, shutter 82 automatically moves back into the path of light 64 by means of the timer controlling solenoid 84. Motor 186 is again actuated at control panel 14, this time to rotate gears 188 and 187 in the opposite rotational direction which thereby lowers rod 164, lift member 162 and casing 125 toward the fully lowered position seen in solid lines in FIG. 6 whereby film casing 125 again fully encases and surrounds film 114. As aforementioned, washer 205 and spring 207 positioned adjacent locking nuts 185 and 185' on rod 164 engage lever 216 which depresses limit switch lever 222 and button 224 when rod 164 is lowered, thereby shutting motor 186 off at the proper time. With film 114 thus being protected from exposure to ambient and artificial light which would over-expose and destroy the hologram of object 69 upon film 114, cover 28 may be removed from housing 110 to access the interior thereof.

With casing 125 in the fully lowered position about film 114, latch members 142 and 144 of frame 108 are re-attached to latch receiving members 134 and 136, respectively, thereby securing casing 125 to frame 108. Latching members 166 and 168 on lift member 162 are then released from latch receiving members 138 and 140 on casing 125 thereby detaching lift member 162 from casing 125. Wing nuts 110 and 112 are loosened whereby frame 108 including film 114 and casing 125 may be slidingly removed from posts 98 and 100 and from housing 10. The film may then be transferred to a day-light bag having a 35 mm daylight developing tank (not shown). The tank would be specially fitted with a rack to hold up to ten film plates separate from each other and adequately accessible to developing chemicals.

It may thus be appreciated that the foregoing holographic camera assembly allows for multiple holograms to be taken in a short period of time. Many film packages comprising the frame, film and film casing may be prepared beforehand for mounting within the housing at class time such that each student may make their own hologram of an object of their choice.

What is claimed is:

1. Apparatus operable to create a holographic film image of a three-dimensional object on a holographic film comprising:
   a) a light-tight housing having a substantially planar bottom surface and including a removable cover to access the interior of said housing;
   b) a coherent light source positioned in said housing interior and selectively operable to emit a coherent light beam directed along a fixed path to impinge upon an object positioned at a first point along said fixed path;
   c) means releasably mounting a holographic film in said housing interior at a second point along said fixed path between said light source and said first point, said film including first and second, opposite planar surfaces lying in spaced, parallel planes substantially perpendicular to said housing planar bottom surface when mounted in said housing interior;
   d) means operable to substantially reduce vibrational effects to said coherent light source, said object and said holographic film during creation of said holographic film image;
   e) light beam diffusing means positioned at a third point along said fixed path between said light source and said second point and operative to diffuse said light beam sufficiently to impinge upon substantially the entire area of said first planar surface of said film and pass through said film to impinge upon and be reflected by said object and impinge upon said second, opposite planar surface of said film thereby forming said holographic image of said object on said film;
   f) a light-tight, removable film casing configured to surround and protect said holographic film from destructive over-exposure due to ambient or artificial light during deposit in and removal from said light-tight housing interior;
   g) means operable externally of said housing to selectively move said film casing about said film between fully covering and fully uncovering positions when said film is mounted in said housing, thereby allowing said diffused light to impinge upon said film when said casing is in said fully uncovering position; and
   h) means selectively operable externally of said housing to cause said coherent light beam to travel along said fixed path and impinge upon said film for a predetermined amount of time.

2. The invention according to claim 1 and further comprising an optics tray having a substantially planar bottom surface, said optics tray bottom surface positioned in said housing in a spaced, parallel plane above said housing bottom surface wherein said vibration reducing means are positioned in the area between said optics tray bottom surface and said housing bottom surface.

3. The invention according to claim 2 wherein said vibration reducing means comprises resilient foam rubber.

4. The invention according to claim 3 wherein said housing bottom surface and said optics tray bottom surface are of substantially square outline, said housing including four side walls perpendicularly and vertically extending in the same direction from the perimeter of said housing bottom surface.

5. The invention according to claim 4 wherein said optics tray includes four side walls perpendicularly and vertically extending in the same direction from the perimeter of said optics tray bottom surface.

6. The invention according to claim 5 wherein said housing side walls and respectively adjacent said optics tray side walls lie in spaced, parallel planes, said housing side walls extending vertically beyond said optics tray side walls.

7. The invention according to claim 6 wherein said means to cause said coherent light beam to travel along said fixed path comprises a shutter and a shutter control mechanism, said shutter control mechanism being mounted to one of said housing four walls and said shutter positioned between said coherent light source and said second point, said shutter actuable to move out of said fixed path for said predetermined amount of time.

8. The invention according to claim 1 wherein said diffusing means comprises a diverging lens mounted to said coherent light source.

9. The invention according to claim 8 and further comprising a front-surfaced mirror rotatably mounted upon said optics tray bottom surface at a fourth point along said fixed path between said third point and said second point, said fixed path extending along a first linear axis between said light source and said mirror, said diffused light being reflected by said mirror thereby extending along a second linear axis between said mirror and said first and second points.

10. The invention according to claim 1 wherein said film is rigid and said film and said film casing are of substantially square outline, said film casing having front and back, parallel, planar walls with first and second side walls and a top wall extending perpendicularly therebetween defining an open bottom, and further comprising a film frame having a substantially planar, elongated base with two spaced, vertical beams extending perpendicularly in the same direction therefrom, said beams each including outside and inside facing surfaces, and whereby opposite, parallel edges of said film are removably and slidingly positioned between said beams in a linear groove traversing each of said inside surfaces of said beams.

11. The invention according to claim 10 and further comprising a substantially planar platform rotatably mounted at said second point and wherein said releasable mounting means comprises at least two spaced, threaded posts vertically mounted into said platform, said frame base including at least two slots each located adjacent opposite ends of said base, said slots being positionally aligned along said base for insertion of said posts therein, and further including a respective pair of securing nuts threadable over the free ends of said posts into tight, abutting engagement against said base adjacent said slots.

12. The invention according to claim 10 and further comprising means releasably securing said film casing to said frame base.

13. The invention according to claim 12 wherein said releasable securing means comprises first and second, spring-loaded latches, said latches pivotally mounted to said frame base adjacent each of said outside surfaces of said beams, the pivot axis of said first and second latches lying perpendicular to the longitudinal axis of said elongated base portion, each of said latches having an edge for selective, mating engagement with an edge of repective first and second latch receiving members, said latch receiving members mounted on each of said opposite, parallel side walls of said film casing adjacent said open bottom.

14. The invention according to claim 13 wherein said film casing moving means comprises a film casing lift mechanism positioned in said housing interior, said lift mechanism including a lift member and further including means to releasably secure said lift member to said film casing, said lift mechanism operable to selectively move in first and second directions, said lift member thereby respectively covering and uncovering said film casing about said film when said lift member is secured to said film casing.

15. The invention according to claim 14 wherein said lift member comprises an elongated bar positioned substantially horizontally within said housing interior above said second point, said bar lying in covering relation to said top wall of said film casing when releasably secured thereto, and further including an elongated, threaded rod fixedly secured to a middle portion of said elongated bar at one end thereof and perpendicularly extending from said bar, terminating at a second, free end, said lift mechanism including a rotatable nut having internal threads engaging said threads on said rod whereby said lift mechanism is operable to rotate said nut in selective, opposite directions thereby respectively raising and lowering said rod and said elongated bar with respect to said nut.

16. The invention according to claim 15 wherein said lift member releasable securing means comprises third and fourth, spring-loaded latches pivotally mounted adjacent each end of said elongated bar, the pivot axes of said third and fourth latches lying perpendicular to the longitudinal axis of said elongated bar, each of said latches having an edge for selective, mating engagement with an edge of respective third and fourth latch receiving members, said latch receiving members mounted on said opposite, parallel side walls of said film casing adjacent said film casing top wall.

17. The invention according to claim 15 wherein said lift mechanism includes a motor actuable externally of said housing, said motor being mounted upon a first mounting member extending horizontally over said second point, a second mounting member extending parallel to and in a plane spaced below said first mounting member, said first and second mounting members including aligned holes wherein said nut is rotatably mounted between said first and second members with the hole of said nut being aligned with said member holes, and whereby said rod extends through said holes of said members and said nut.

18. The invention according to claim 17 wherein said nut is mounted at the center of a first gear and being rotatable therewith, said motor actuable to rotate a second gear in meshing engagement with said first gear.

19. The invention according to claim 17 and further including first and second limit switches operable to control operation of said motor, said first limit switch positioned on said first mounting member adjacent said rod whereby a first washer and spring positioned on said rod adjacent said second, free end may travel downwardly with said rod to actuate said first limit switch to turn off said motor when said casing is in said fully covering position, and said second limit switch positioned on said second mounting member adjacent said rod whereby a second washer and spring positioned on said rod adjacent said first end travels upwardly with said rod to actuate said second limit switch to turn off said motor when said casing is in said fully uncovering position.

* * * * *